United States Patent [19]

Oldershaw et al.

[11] 3,709,351
[45] Jan. 9, 1973

[54] AUTOMATIC BULK FEEDING AND DISTRIBUTING APPARATUS

[75] Inventors: C. G. Peter Oldershaw, Avon; Don De Kramer, Lima, both of N.Y.

[73] Assignee: General Foods Corporation, White Plaines, N.Y.

[22] Filed: Feb. 4, 1971

[21] Appl. No.: 112,532

[52] U.S. Cl. ..................................198/37, 198/81
[51] Int. Cl. ............................................B65g 43/08
[58] Field of Search ........222/55, 56; 198/66, 37, 81, 198/83, 42, 85, 30; 214/16

[56] References Cited

UNITED STATES PATENTS

| | | | |
|---|---|---|---|
| 3,185,346 | 5/1965 | Loveall, Jr. et al. | 222/55 |
| 2,828,873 | 4/1958 | Arlin | 222/56 X |
| 2,310,460 | 2/1943 | Randolph | 222/56 X |
| 3,559,846 | 2/1971 | Hastrup | 222/55 |
| 1,460,573 | 7/1923 | Church et al. | 222/55 X |
| 2,537,005 | 1/1951 | Brown et al. | 198/66 X |
| 2,343,722 | 4/1944 | Wagner | 222/55 |

Primary Examiner—Evon C. Blunk
Assistant Examiner—H. S. Lane
Attorney—Thomas V. Sullivan and Bruno P. Struzzi

[57] ABSTRACT

Apparatus for automatic bulk feeding and distribution of products. The apparatus provides for an even, uninterrupted flow of product from a bulk infeed station to a group of individual work stations so that a group of individual processing lines or machines are assured a continuous supply of product. The apparatus comprises product supply means, conveyor means upon which product for feeding and distribution is carried and may build up, means associated with the conveyor means allowing for transfer of product therefrom, segmented gate means through which product passes as it is carried upon and along the conveyor means, means for detecting the level of product as it is carried along the conveyor means, control means which are connected to the gate means and detecting means and the product supply means and product receiving and discharging means which are associated with the conveyor means and control means. The apparatus is especially useful in the processing of agricultural commodities.

8 Claims, 7 Drawing Figures

AUTOMATIC BULK FEEDING AND DISTRIBUTING APPARATUS

BACKGROUND OF THE INVENTION

In the large-scale processing of agricultural commodities it is essential that such commodities, hereinafter referred to as product, be uniformly and continuously fed and distributed to various work stations along the processing lines. Thus, the work stations may involve any one of a number of different operations including, inter alia, washing, cooking, inspecting, canning, freezing, and packaging the product. Usually, however, a uniform and continuous flow of product is not always achieved, thereby reducing the efficiency of the processing operations. In other words, with a non-uniform and discontinuous flow of product to the various work stations it frequently happens that the work stations along the processing lines will have product in either short supply or excess supply because of the integrated nature of the work stations and the processing lines, the speeds of the several operations, and the huge quantities of product processed.

SUMMARY OF THE INVENTION

A principal object of the present invention is to provide an apparatus for feeding and distributing to a number of work stations or processing lines a uniform and continuous flow or quantity of product as may be required by the work stations or processing lines.

Another object of the invention is to provide an apparatus for uniformly and continuously feeding and distributing product to a number of work stations including conveyor means upon and along which the product is carried and upon which product may build up, and means associated with the conveyor means allowing for transfer of product to product receiving and discharging means.

A further object of the invention is to provide an apparatus which includes in combination segmented gate means through which the product passes, means for detecting the buildup of product on the conveyor means, and control means which are connected to the gate means and detecting means so as to assure uniform and continuous feeding and distribution of product to the work stations.

Yet another object of the invention is to provide an automatic bulk feeding and distributing apparatus which includes in combination with the conveyor means, gate means and detecting means and control means, product supply means and product receiving and discharging means, which are operatively controlled by and connected to detecting means and control means.

An additional object of the invention is to provide an apparatus that permits product which is to be fed and distributed to a number of work stations to be intermittently stored and thereafter to be available on demand at the work stations.

Still another object of the invention is to provide an apparatus allowing for uniform and continuous flow of product to a number of work stations while obviating the necessity for recirculation of the product and while avoiding extensive damage to a product as it is fed and distributed to the work stations.

A still further object of the invention is to provide for automatically feeding and distributing product with an apparatus requiring low maintenance and also offering economies in processing such product.

The foregoing objects as well as others and features of the invention will be apparent from the following description taken in conjunction with the accompanying drawings.

DETAILED DESCRIPTION

Figure 1:
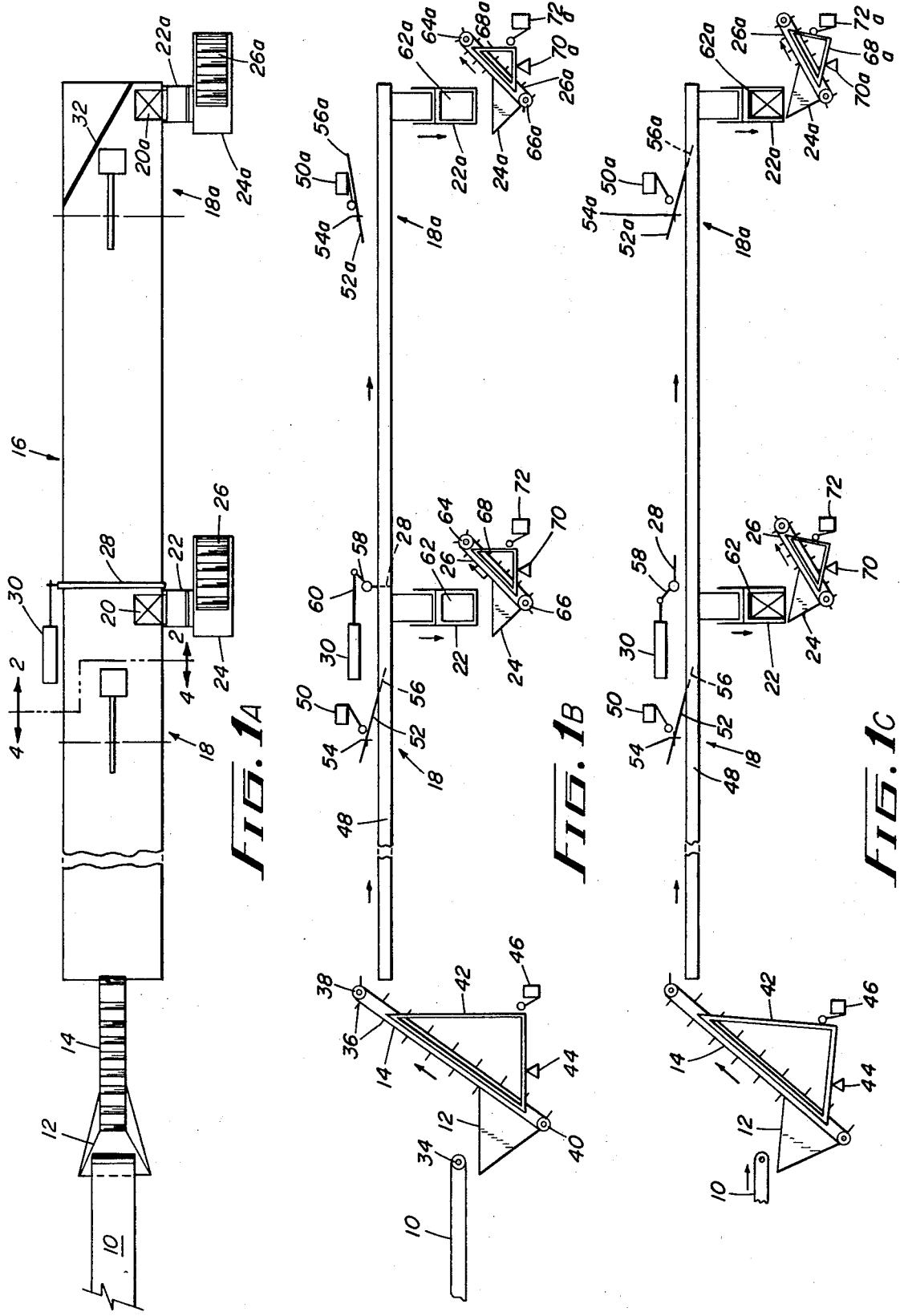
FIG. 1A is an overall diagrammatic plan view of the apparatus of the present invention.
FIG. 1B is a diagrammatic side elevation of the apparatus.
FIG. 1C is an additional diagrammatic side elevation illustrating certain of the components of the apparatus in a changed operating condition from that shown in FIG. 1B.

Referring in more detail to the drawings, FIG. 1A shows a supply conveyor 10 from which product is fed to supply hopper 12 and supply elevator conveyor 14 which form a product supply means or supply assembly. A vibratory conveyor assembly is shown at 16 with stationary frame and vibrating mechanism not shown. Mounted on the stationary frame are product depth sensing assemblies 18 and 18a and supply control gate 28. Discharge chutes 20 and 20a lead into gated storage chutes 22 and 22a. Product after traveling along the vibratory conveyor is discharged through the discharge chutes and gated storage chutes into product receiving and discharge means or feed assemblies comprising feed hoppers 24 and 24a and feed elevator conveyors 26 and 26a. The feed assemblies supply product uniformly and continuously to each of the work stations or processing lines with which the apparatus is connected. Segmented control gate 28 regulates the flow of product toward discharge chute 20a on vibratory conveyor assembly 16, and the gate is opened or closed by means of segmented control gate actuator 30. At the terminal end of the vibratory conveyor is a deflector plate 32 which serves to direct product towards the last discharge chute 20a.

In FIG. 1B supply conveyor 10 is shown driven by drive pulley 34 connected to motor drive means not shown. Product passes from the conveyor into hopper 12 and thence onto elevator conveyor 14 fitted with cleats 36 and driven by means of drive pulley 38 connected to motor drive means not shown and tail pulley 40. The elevator conveyor 14 is mounted on frame 42 and the assembly, by pivoting on pivot 44, may contact limit switch 46. Although a limit switch is here shown at 46, other means such as pilot valves and the like may be employed. Product is discharged from the elevator conveyor onto vibratory conveyor pan 48 and thereafter flows toward the product depth sensing assembly 18. The assembly 18 includes limit switch 50 for actuation by pivot arm assembly 52 pivoted at 54 and equipped with product depth sensing paddle 56, here shown partially hidden.

Upon signal from the product depth sensing assembly 18a, the crank arm 58 moving by means of piston rod 60 closes the segmented control gate 28. The product thereupon stops feeding toward discharge storage chute 22a.

The product entering discharge storage chute 22, upon opening of discharge storage chute gate 62, passes into hopper 24. The product is then carried up elevator conveyor 26 driven by means of drive pulley 64, connected to motor and drive means not shown, and tail pulley 66. The elevator conveyor is mounted on frame 68 which is pivoted about pivot 70 so as to be able to actuate limit switch 72. The same operation is repeated at the next work station whereupon product similarly enters discharge storage chute 22a, hopper 24a, elevator conveyor 26a with pulleys 64a and 66a on frame 68a pivoted at 70a for actuating limit switch 72a.

In FIG. 1C the feed assembly hoppers, being empty, allow the pivoted feed assembly to tilt, contacting limit switches 72 and 72a which operate to open gates 62 and 62a, allowing product to drop from discharge storate chutes 22 and 22a into hoppers 24 and 24a.

Figure 2:
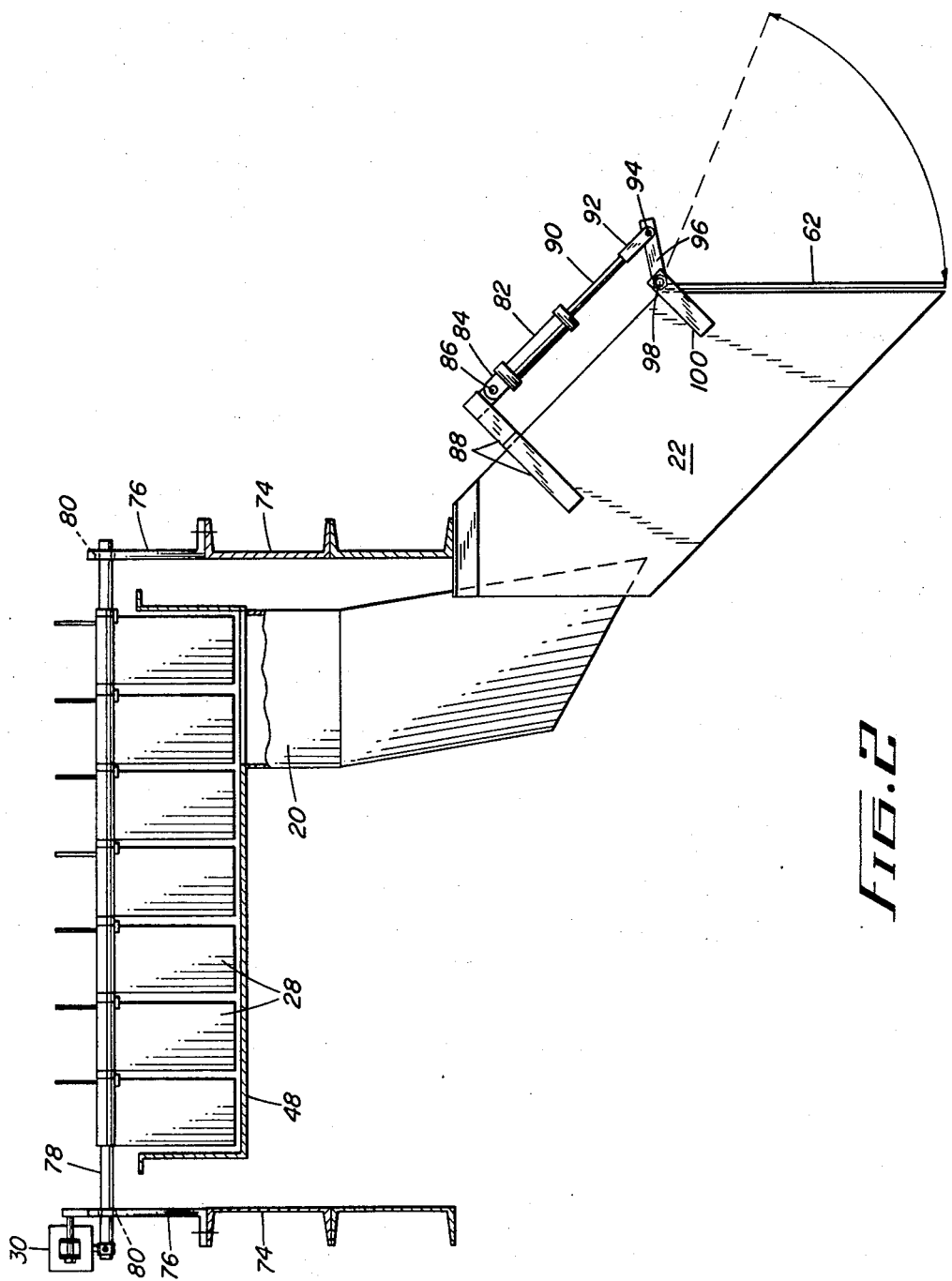
FIG. 2 is a cross-sectional view taken along line 2—2 of FIG. 1A illustrating the segmented gate means and product transfer means.

As appears more fully in FIG. 2, the segmented gate assembly is positioned on vibratory conveyor frame 74 with gate mounting bracket 76, which carries shaft 78 within journal bushings 80, and thus is not connected to the vibratory conveyor pan.

Discharge chute 20 is shown leading into discharge storage chute 22 which is attached to frame 74. Discharge storage chute gate 62 is opened and closed upon control signal (from limit switch 72) through actuator cylinder 82 mounted with clevis 84 and clevis pin 86 to bracket 88. The cylinder forces piston rod 90 to act through clevis 92 with its clevis pin 94 to rotate crank arm 96 attached to gate 62 which is pivotally supported about shaft 98 held in bracket 100 on the chute.

Figure 3:
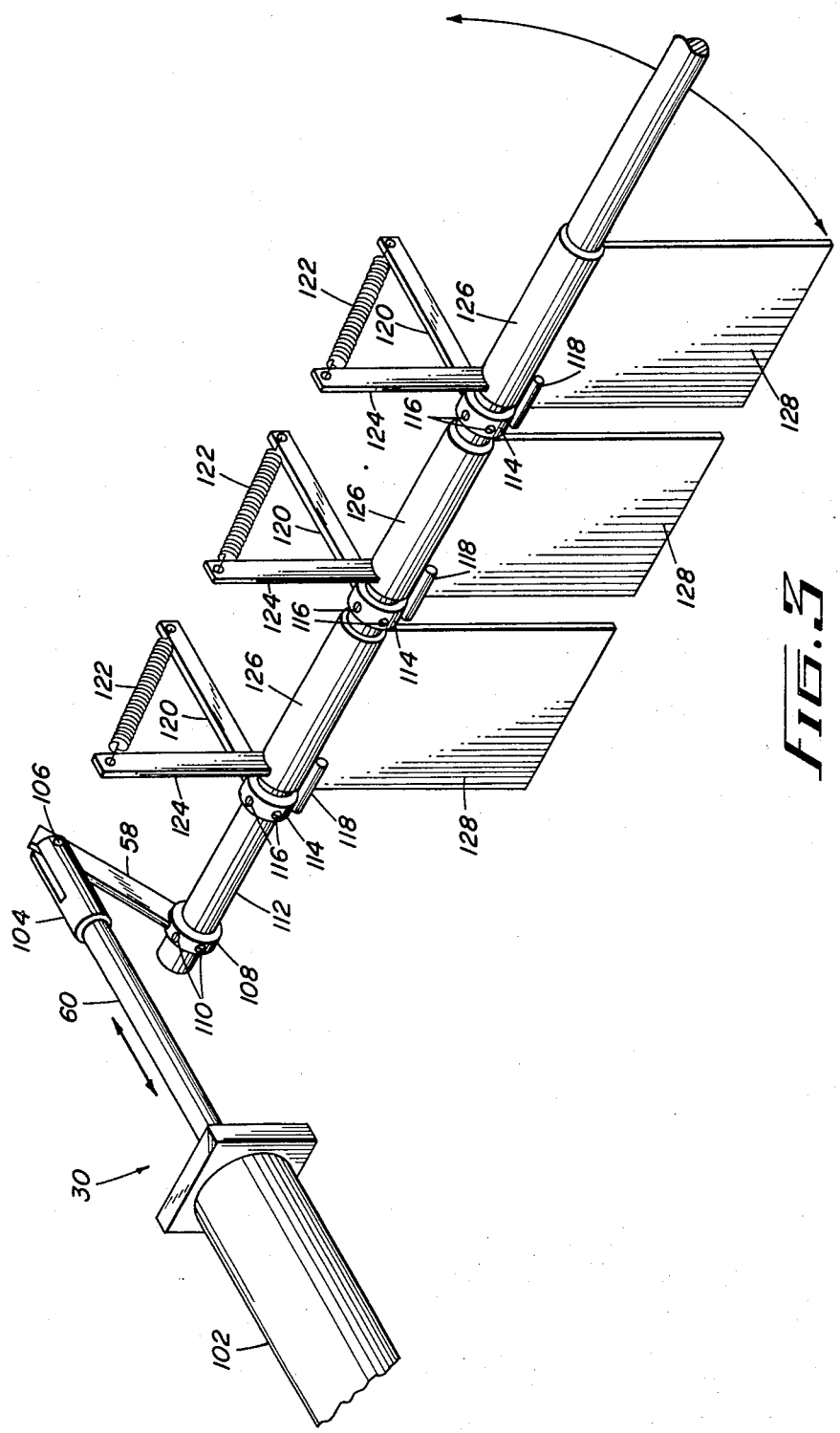
FIG. 3 is an isometric view showing the construction details of the segmented gate means and a portion of the control means employed in the apparatus.

In FIG. 3, the segmented control gate actuator and segmented gate assembly are shown in detail. The actuator comprises segmented control gate actuator cylinder 102 having piston rod 60 attached to crank arm 58 by means of clevis 104 and clevis pin 106. The crank arm by means of collar 108 having set screws 110 is connected to the shaft here shown as 112.

Collars 114 with set screws 116 (with travel-limiting dogs 118) are adapted with mounting arms 120 whose springs 122 are attached to upwardly extending posts 124. These posts are fastened to gate journal sleeves 126 to which the segmented gate portions 128 are also attached.

Figure 4:
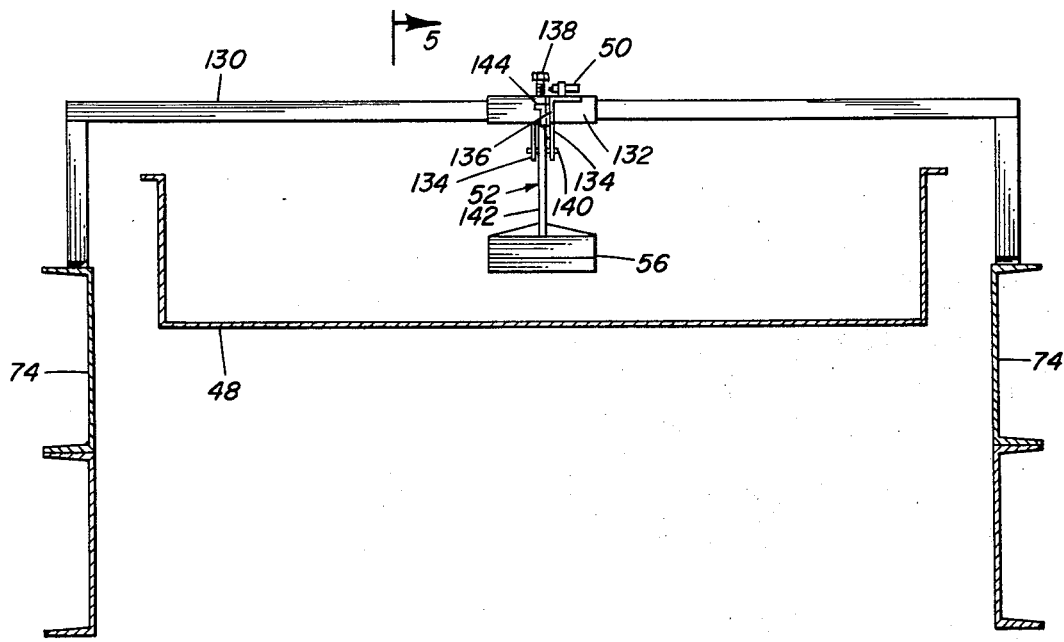
FIG. 4 is a cross-sectional view taken along line 4—4 of FIG. 1A illustrating the detecting means for sensing the depth of the product on the conveyor means of the apparatus.

FIG. 4 is a cross-sectional view showing a product depth sensing assembly. As appears more fully in this figure, the assembly includes a mounting bracket 130 positioned on the sides of the frame of the vibratory conveyor. Positioned on mounting bracket 130 is sleeve bracket 132 to which are attached pivot arms 134, limit switch bracket 136 and motion limiting screw 138. Attached through pivot pin 140 is pivot arm assembly 52 consisting of pivot arm 142, sensing paddle 56, and actuator plate 144. Actuator plate 144 acts upon limit switch 50 to provide a control signal to its respective upstream control element.

Figure 5:
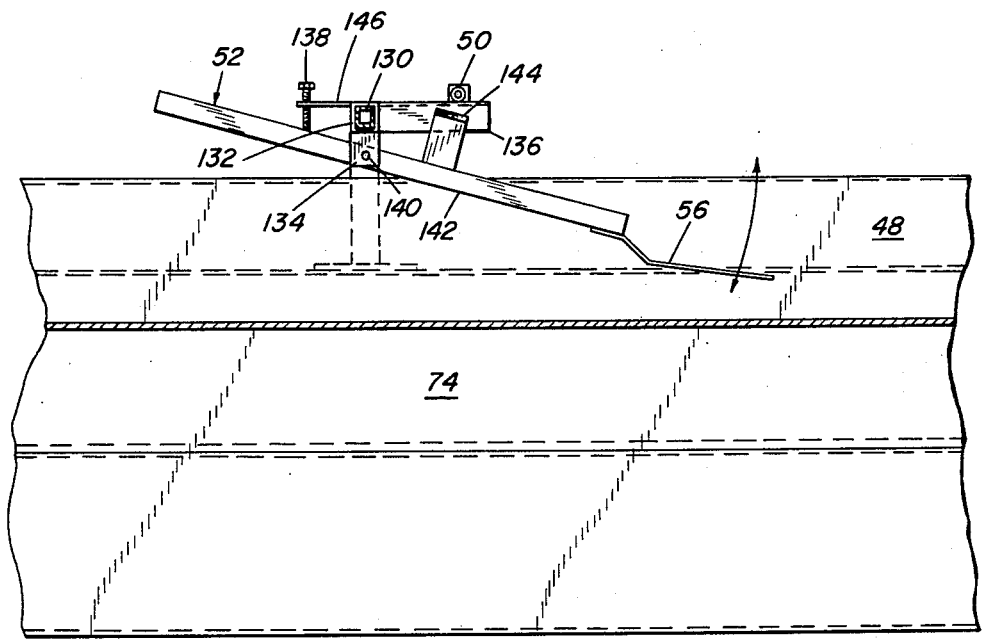
FIG. 5 is a partial sectional view taken along line 5—5 of FIG. 4.

FIG. 5 is a sectional view taken along line 5—5 of FIG. 4 and indicates the path of travel of the product depth sensing paddle 56 over product which would ordinarily be carried upon the vibrating pan 48 of the vibratory conveyor assembly. This illustration also indicates the motion limiting screw mounting plate 146.

When the apparatus is operating, the system performs as follows:

1. All equipment operating;
2. Feed elevator conveyors 26 and 26a demanding product (Gates 62 and 62a open);
3. Product flows from supply conveyor 10 through supply elevator conveyor 14 and along vibrating conveyor pan 48 dropping through chutes 20 and 20a;
4. When hopper 24a fills to a pre-determined point the weight of product is sufficient to tip the feed elevator conveyor 26a, thereby actuating limit switch 72a.
5. Limit switch 72a, upon opening, allows air to flow to air cylinder, such as illustrated as 82, thereby closing the discharge storage chute gate 62a and shutting off flow of product into hopper 24a,
6. After a sufficient amount of product has been conveyed to fill discharge storage chute 22a, the product backs up into vibrator pan, deflecting product depth sensing paddle 56a upward;
7. When product sensing paddle 56a is deflected upward by product build-up, limit switch 50a is opened by contact with actuator plate 144 and causes air to flow to air cylinder 102 closing segmented control gate 28;
8. Product now builds up behind segmented control gate 28;
9. If and when feed elevator conveyor 26 is filled, like steps 4, 5 and 6, discharge storage chute gate 62 closes and product backs up through discharge storage chute 22 into vibrator pan.
10. As product builds up behind segmented control gate 28, product depth sensing paddle 56 is deflected upward allowing air to flow through limit switch 50 which activates a pressure switch opening the motor switch of supply elevator conveyor 14 drive, thereby shutting off feed to vibrator conveyor assembly 16;
11. Product continues to flow into supply hopper 12 from supply conveyor 10 until, like feed elevator conveyors 26 and 26a, it tips and opens limit switch 46 allowing air to flow to a pressure switch which in turn opens motor switch of supply conveyor 10 and simultaneously shuts down all upstream conveying equipment;
12. At any time during this operation, it can be seen that when feed elevator conveyors 26 and/or 26a again demand product the particular steps involved will generally be reversed and product flow will continue as required;
13. It is not necessary that feed elevator conveyor 26 be demanding to allow supply elevator conveyor 14 to again feed product;
14. The number of work stations could be expanded, limited only by conveying capacity of vibratory conveyor assembly 16;
15. From the foregoing, it can be seen that supply of product to each feed elevator conveyor 26 and 26a will be available regardless of upstream or downstream demand conditions even when this system is expanded to feed additional work stations. Also, supply hopper 12 will be kept filled by supply conveyor 10 regardless of demand conditions in the vibratory conveyor assembly 16;

16. Vibratory conveyor assembly 16 operates continuously.

The discharge storage chute gate 62 shown is closed or opened by action of the feed elevator conveyor at the individual work stations on their respective limit switches.

The pivot arm assembly 52 can be adjusted to a position allowing a desired depth of product to flow beneath the product depth sensing paddle 56 without actuating the limit switch which controls the respective upstream control elements. Operation of this mechanism is further pointed out in steps 7 and 9 of the description of operation of the apparatus and performance of the system.

Generally, the action of the segmented control gate 28 is:

1. Cylinder piston rod 60 extends or retracts moving the crank arm 58 which rotates the shaft 112.

2. When the shaft 112 rotates, mounting arm 120 is likewise rotated since it is locked to the shaft 112.

3. Each spring 122 which connects the mounting arm 120 to the post 124 of the gate segment 128 holds the segment against the travel-limiting dog 118 and therefore when the shaft 112 rotates, the entire unit rotates except as noted in 4 below.

4. The purpose of the individual spring loaded gate segments 128 is to prevent injury to product which may be trapped under the gate when it moves to the closed position. In so doing, the spring tension is sufficient to hold the trapped product and thus block flow of other product while the remaining gate segments come to a fully closed position.

The apparatus of the present invention offers a number of desirable advantages and features. A principal feature is the fact that no recirculation of product is involved, thus allowing for maximum throughput of product without extensive damage thereto and without undue retention of product in the system.

Another feature is that the apparatus permits brief storage of product at each work station and thereby assures availability of product at such work station when required.

An additional feature is that the segmented control gate can close to stop the flow of product along the vibratory conveyor though one or more of the independently yieldable gate segments may be partially held open by the presence of product trapped between the gate segment or segments and the pan of the vibratory conveyor. Furthermore, the product trapped by the yieldable gate segments is not damaged when it is trapped.

A further feature is that of little maintenance which results from having the segmented gate and sensing assemblies mounted on the stationary frame of the vibrating conveyor rather than on the vibrating pan where excessive vibration might be encountered.

The foregoing is considered and is to be understood as illustrative only of the principles of the present invention. Further, since numerous modifications and changes will be readily apparent to those skilled in the art, it is not desired to limit the invention to the exact construction, details, and operation shown and described. Accordingly, various modifications and changes can be made within the scope of the invention as defined in the appended claims.

We claim:

1. Apparatus for automatic bulk feeding and distribution of product to a number of work stations comprising, in combination,
   a. product supply means,
   b. conveyor means upon which product for feeding and distribution is carried and may build up,
   c. means associated with said conveyor means allowing for transfer of product therefrom,
   d. segmented gate means through which product may pass and against which product may stop on said conveyor means,
   e. means for detecting the level of product on said conveyor means,
   f. control means connected to said segmented gate means and said detecting means,
   g. means for receiving and discharging product to a number of work stations, and
   h. control means therewith.

2. Apparatus according to claim 1 in which said means for detecting the level of product and said (f) control means activate said segmented gate means.

3. The apparatus according to claim 2 in which said (h) control means activate a gate associated with said product receiving and discharging means.

4. Apparatus according to claim 3 in which said control means and said means for detecting the level of product activate said product supply means.

5. Apparatus according to claim 4 in which said product supply means and said product receiving and discharging means are a hopper associated with a tilting conveyor.

6. Apparatus according to claim 5 in which said control means and means for detecting the level of product include limit switches.

7. Apparatus according to claim 6 in which said conveyor means includes a vibratory pan.

8. Apparatus according to claim 7 in which said segmented gate means, said means for detecting the level of product, and said control means are mounted on stationary frames.

* * * * *